2,708,173
Patented May 10, 1955

2,708,173
ELECTRICAL CONDUCTOR HAVING INSULATION CONTAINING A POLYVINYL CHLORIDE RESIN AND A PENTAERYTHRITOL DIBUTYRATE DICAPRYLATE PLASTICIZER

Milton S. Greenhalgh, Bridgeport, and Stanton C. Martens, New Haven, Conn., assignors to General Electric Company, a corporation of New York No Drawing. Application May 27, 1954,
Serial No. 432,914

3 Claims. (Cl. 117—232)

This invention is concerned with improved electrical conductors having insulation thereon comprising a solid vinyl chloride resin and a plasticizer therefor comprising pentaerythritol dibutyrate dicaprylate containing from 0.1 to 0.5 per cent hydroxyl.

The insulation requirements for various industrial electrical conductors (such as machine tool wiring or industrial appliance wire) have increased within recent years because of more widespread applications to a point where it is required that the insulated conductor be able to withstand temperatures heretofore considered outside the range of the usual thermoplastic insulation, and also to maintain at a high level the insulation resistance of the insulated conductor under the most adverse conditions, for instance, in high moisture-containing environments. Thus, in such applications as in machine tool wire or in enclosed motors which are being run at higher temperatures than have heretofore been employed, as well as in construction wires and insulated conductors where the latter may come in contact with steam pipes or other heated devices, and where contact with moisture conditions is a requirement for operation, considerable difficulty has been encountered in employing electrical conductors insulated with thermoplastic vinyl halide type insulation. Up to the present time, there has been no acceptable thermoplastic for use at 90° C. in dry locations with concurrent ability to operate at 60° C. in wet locations (i. e., under water or in high moisture atmospheres.)

In addition to the requirement of high temperature applications, there are many applications in which the presence of moisture, either in the atmosphere or due to condensation on the insulation, causes an undesirable drop in the insulation resistance of the electrical conductor, and this drop in insulation resistance is a continuous affair rendering useless in many instances the insulation on the conductor. In connection with the operation of enclosed motors at elevated temperatures, the ability to maintain a high level of insulation resistance under high humidity conditions is also a serious problem in this application.

Unexpectedly, we have discovered that a specific type thermoplastic insulation in combination with electrical conductors is able to operate satisfactorily in dry locations at temperatures as high as 90° C. without any deleterious effects even after long periods of time at the latter temperature. It has been found that this particular insulated electrical conductor when aged at 90° C. for long periods of time shows scarcely any change in the physical properties of the insulation over the physical properties of the same insulation prior to the heating at 90° C. Moreover, after heating at 90° C. for extended periods of time, the insulation is as flexible as it was prior to the heating thereof and can be readily flexed around a 1/4" mandrel without any apparent harmful effects.

Of equal significance is the unexpected discovery that contrary to the experience with other thermoplastic insulated conductors, when operated in a wet location (e. g., when immersed in water), after an initial small decline in insulation resistance, the insulation resistance of our insulated conductors rises to a point much higher than the initial insulation resistance under the above-mentioned high moisture or water immersion conditions even after long periods of time under water. This unexpected result is in direct contrast to the usual experience with previously insulated conductors (using thermoplastic insulation) which show a steady decrease in insulation resistance under comparable test conditions.

In accordance with our invention, we employ a specific combination of ingredients as insulation for electrical conductors in which the thermoplastic insulation is composed of a vinyl chloride resin and an unbalanced plasticizer comprising pentaerythritol dibutyrate dicaprylate containing from 0.1 to 0.5 per cent hydroxyl which, because of the unbalance in the acid residue in the ester (in contrast to the usual tetraesters in which all acid residues are the same) is believed to give these unexpected and unpredictable improved results.

The vinyl halide resin employed in the practice of the present invention may comprise either a homopolymer of vinyl halide, for example, polyvinyl chloride, polyvinylidene chloride, etc., or mixtures of vinyl halides, e. g., vinyl chloride, vinylidene chloride, etc., with each other, or mixtures of one or both with minor proportions of other monomers copolymerizable therewith as, for instance, vinyl acetate, vinyl propionate, vinyl butyrate, methyl methacrylate, methyl acrylate, and other similar copolymerizable materials. By minor proportion is meant less than 50 per cent, by weight, of the total weight of the monomeric materials prior to copolymerization. We prefer to use either polyvinyl chloride or a copolymer of vinyl chloride and vinyl acetate in which the vinyl acetate comprises from about 1 to 20 per cent of the total weight of the vinyl ester and the vinyl chloride.

The specific type of plasticizer employed is critical if one is to obtain the optimum properties in the insulated conductors recited above. The plasticizer used in combination with the vinyl chloride resin is critical and comprises essentially pentaerythritol dibutyrate dicaprylate of the formula

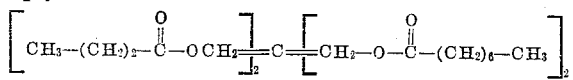

in which plasticizer there is present from 0.1 to 0.5 per cent hydroxyl as a result of a small portion of the ester plasticizer containing an unesterified hydroxyl group. Such a plasticizer of stipulated per cent hydroxyl may be prepared by esterifying pentaerythritol with a mixture of butyric and caprylic acids (in substantially equimolar concentrations) in a molar ratio of 1 mole of the former to 4 moles of the mixture of acids, employing the usual esterification catalysts, such as phosphoric acid, triphenyl phosphite, etc. The reaction is carried out in such a manner that all four of the hydroxyl groups of the pentaerythritol are esterified with the mixture of butyric and caprylic acids. With this latter material is mixed a similar pentaerythritol ester prepared by esterifying 1 mole pentaerythritol and 3 moles of the mixture of butyric and caprylic acids so that there is obtained a triester with one of the pentaerythritol hydroxyl groups unesterified. This triester is mixed with the tetraester in such proportions that the per cent hydroxyl of the mixed plasticizer so prepared is within the range of from 0.1 to 0.5 per cent. Alternatively, the aforesaid pentaerythritol ester of stipulated per cent hydroxyl may be prepared by direct esterification of 1 mole pentaerythritol with slightly less than 4 moles of the mixture of butyric and caprylic acids, employing the latter mixture in the necessary molar concentration to give the desired per cent hydroxyl. Persons skilled in the art will have little difficulty in determining the various methods which can be used to make the specific plasticizer of the required hydroxyl content recited above. Means for measuring the per cent hydroxyl may be found described in the book Organic Analysis, volume 1, published by Interscience Publishers, Inc., New York, N. Y. (1953), edited by Mitchell, Kolthoff, Proskauer and Weissberger.

In using the above-mentioned plasticizer for the vinyl chloride resin, the per cent hydroxyl in the pentaerythritol dibutyrate dicaprylate must be within the range of 0.1 to 0.5 per cent hydroxyl. Per cent hydroxyls above or below this critical range will not have the unexpected outstanding insulation resistance under wet conditions characteristic of the insulation employing the plasticizer with the specified per cent hydroxyl range. In addition, if the per cent hydroxyl is above 0.5 per cent, for instance, 0.9 per cent, it will be found that there is a reduction in the thermal resistance of the insulation.

The amount of the pentaerythritol dibutyrate dicaprylate plasticizer employed in combination with the vinyl chloride resin is preferably within the range of from about 30 to 70 per cent, by weight, based on the weight of the vinyl chloride resin. Within this range, optimum heat resistance and insulation resistance are attained.

An advantageous range of ingredients which can be used in the practice of the present invention for insulating electrical conductors and which will give the above-described improved heat resistance and insulation resistance is as follows, wherein the ingredients listed are on a weight basis and the values in parentheses constitute preferred ranges:

| Ingredients: | Parts by weight |
|---|---|
| Vinyl chloride resin (e. g., polyvinyl chloride) | 100 |
| Pentaerythritol dibutyrate dicaprylate ester of from 0.1 to 0.5 per cent hydroxyl | 30–70 (45–60) |
| Stabilizer (e. g., Tribase-E) | 5–15 (8–12) |
| Filler | Up to 25 |

Prior to application of the insulation onto the electrical conductors by any of the methods well known in the art (e. g., by extrusion of the insulation over the wire conductor), it may be desirable to incorporate various modifying agents usually employed with vinyl chloride resins, for example, stabilizers, various fillers, antioxidants, lubricants, pigments, etc. The apparatus required for coating the conductor (which may be made of copper, aluminum, copper alloy, etc.) may be any of those well known in the art for the purpose, such as extrusion apparatus employing the conditions ordinarily used in such applications.

In order that those skilled in the art may better understand how the present invention may be practiced, the following example is given by way of illustration and not by way of limitation. All parts are by weight.

EXAMPLE 1

A series of resinous mixtures was prepared by compounding on differential rolls 56 parts polyvinyl chloride and 30 parts pentaerythritol dibutyrate dicaprylate containing different per cents hydroxyl. In each formulation there was also incorporated 6 parts of a stabilizer for the polyvinyl chloride, specifically Tribase-E (which is a complex lead silicate-lead sulfate salt) as well as 8 parts of a clay filler (No. 30 Burgess Clay). This mixture of ingredients was extruded onto a No. 20 copper conductor employing the usual extrusion apparatus for the purpose so that the wall insulation was about 1/32" thick. One sample of extruded insulated conductor in which the plasticizer had a hydroxyl content of 0.4 per cent was heated at 97° C. for 60 days. At the end of this time, a sample of this insulated, aged wire could be readily flexed around a 1/4" mandrel without any evidence of cracking of the insulation. A sample of this particular type of insulation (containing 0.4 per cent hydroxyl) was also molded into the form of flat sheets, heated for 60 days at 97° C., and tested for tensile strength and per cent elongation. These tests showed that the physical properties of the latter material, even after the drastic heat aging at 97° C., were essentially unchanged from the unaged material.

Samples of the above-described insulated copper conductors containing as insulation polyvinyl chloride plasticized with pentaerythritol dibutyrate dicaprylate having different per cents hydroxyl were subjected to an insulation resistance test which comprised immersing each insulated conductor in water maintained at a temperature of 50° C. for varying lengths of time and determining periodically the insulation resistance in megohms per 1000 feet of insulation. This test is a standard one approved by Underwriters' Laboratories. The following Table I shows the insulation resistance of each of these insulated conductors in which different per cents hydroxyl were present in the pentaerythritol tetracaproate plasticizer for the polyvinyl chloride. The per cents hydroxyl in the plasticizer were varied both within and without the critical 0.1 to 0.5 per cent range recited above. The insulation resistance recited under each sample number showing the per cent hydroxyl is in megohms per 1000 feet of insulated conductor.

*Table I*

| Sample | No. 1 | No. 2 | No. 3 | No. 4 | No. 5 | No. 6 | No. 7 [a] |
|---|---|---|---|---|---|---|---|
| Weeks Immersion | 0.23% OH | 0.40% OH | 0.9–1.0% OH | 0.05% OH | 0.64% OH | 1.05% OH | |
| 1 | 26.4 | 24.1 | 5.74 | 20.3 | 6.90 | 1.93 | 4.56 |
| 2 | 14.8 | 8.27 | 6.21 | 6.72 | 3.12 | 1.30 | 5.75 |
| 3 | 13.6 | 6.16 | 3.78 | 4.41 | 2.41 | 1.15 | 5.92 |
| 4 | 11.0 | 4.75 | 3.65 | 4.11 | 2.38 | 1.27 | 5.94 |
| 5 | 9.45 | 4.58 | 4.25 | 4.17 | 2.38 | 1.35 | |
| 8 | 6.43 | 3.59 | 3.08 | 4.95 | 3.08 | 1.77 | 4.41 |
| 10 | 6.37 | 4.42 | 3.69 | 5.65 | 3.30 | 2.09 | 4.60 |
| 12 | | | 2.95 | | | | |
| 13 | | | [b] Disc. | 6.03 | 3.79 | 2.67 | 3.42 |
| 16 | 9.6 | 8.17 | | 7.13 | 4.35 | 3.37 | |
| 20 | 22.0 | 17.00 | | 9.44 | | | |
| 22 | 30.7 | 23.0 | | | | | 2.48 |
| 24 | | | | 9.83 | 6.61 | 5.67 | [b] Disc. |
| 29 | 51.0 | 30.1 | | [b] Disc. | [b] Disc. | [b] Disc. | |
| 39 | 66.4 | 44.6 | | | | | |
| 52 | 113.4 | 74.8 | | | | | |
| 73 | 149.4 | 102.1 | | | | | |
| 91 | 121.0 | 93.0 | | | | | |
| 95 | 131.5 | 100.8 | | | | | |
| 99 | 139.0 | 103.7 | | | | | |

[a] This sample comprised an insulated conductor approved by the Underwriters' Laboratories for operation at 80° C. in which the insulation was composed of polyvinyl chloride, tricresyl phosphate, acetylated castor oil, a stabilizer and fillers, as is more particularly described below.

[b] Insulation tests discontinued because resistance was either declining or else was increasing so slightly (as compared to Sample Nos. 1 and 2) that no useful purpose could be served whereby continuance of the insulation resistance test was justified.

The above example illustrates clearly the marked heat resistance obtainable using the specific plasticizer embraced within the scope of the present invention. This heat resistance should be contrasted with the heat resistance of a similarly insulated electrical conductor in which the insulation comprised 45 parts polyvinyl chloride, 25 parts tricresyl phosphate, 5 parts acetylated castor oil, 3 parts of the above-mentioned Tribase-E, 5 parts clay and 17 parts whiting (Keystone Whiting). This latter insulated conductor has been approved by Underwriters' Laboratories for operation at a maximum temperature of 80° C. When this latter insulated conductor was tested at 90° C. (in contrast to the 97° C. temperature at which the claimed insulated conductor was tested), it became brittle in a relatively short period of time and useless as a protecting and insulating coating for the conductor.

Reference to Table I will also reveal the unexpected results obtainable using pentaerythritol dibutyrate dicaprylate having the stipulated per cent hydroxyl range, whereby the insulation resistance dropped off somewhat for several weeks, and then in a completely unpredictable manner the insulation resistance increased markedly as the water immersion test continued. Where the per cent hydroxyl was outside the stipulated range, the insulation resistance with time either remained constantly at a low level so that no significant insulation could be expected, or else began to decrease to a point where the insulation resistance was poor.

In addition to the polyvinyl chloride employed in the above-identified example, it will also be apparent that other vinyl chloride resins or copolymers of vinyl chloride with other copolymerizable materials may be employed in their place without departing from the scope of the invention. Other stabilizers such as heat and light stabilizers (which prevent discoloration of vinyl halide resins upon exposure to high temperatures or upon prolonged exposure to light) may be added in place of the ones employed in the foregoing example. Among such stabilizers may be mentioned, for example, PbO, $Pb_2O_3$, $Pb_3O_4$, tribasic lead sulfate, tribasic lead silicate, etc.

Various fillers (which may comprise, by weight, from about 0 to 100 per cent, preferably up to 25 percent, based upon the weight of the vinyl halide resin) and pigments commonly used in combination with vinyl halide resins for insulating purposes may be included in the composition as, for example, carbon black, barytes, titanium dioxide, various clays, etc. Finally, in addition to the plasticizer employed and described previously, one may also incorporate small amounts of other plasticizers, e. g., up to 10 per cent, by weight, of the vinyl chloride resin. However, optimum results are obtained when the plasticizer consists essentially of the above-specified pentaerythritol dibutyrate dicaprylate.

The electrical conductors described in the present invention have utility in combination with various appliances many of which have been mentioned above. They are of particular value in applications, such as machine tool wires, which require operation of electrical equipment at temperatures in excess of 80° C. for varying periods of time. The ability of the insulated conductor attached to such electrical equipment to operate at these elevated temperatures of 90° C. is a distinct advantage in modern factories.

Of significance equal to the heat resistance is the ability of the insulated conductors herein described to operate under high moisture or wet conditions, not only without loss of insulation resistance, but even attended by an unexpectedly marked increase in kind in the insulation resistance.

What we claim as new and desire to secure by Letters Patent of the United States is:

1. An insulated conductor intended for use at 90° C. and having improved insulation resistance in wet locations at 60° C. comprising (1) a metallic core and (2) insulation for the latter comprising (a) a solid vinyl chloride resin selected from the class consisting of polyvinyl chloride and copolymers of vinyl chloride and vinyl acetate and (b) a plasticizer for the vinyl chloride resin comprising pentaerythritol dibutyrate dicaprylate having a per cent hydroxyl within the range of from about 0.1 to 0.5 per cent, said plasticizer comprising, by weight, from 30 to 70 per cent of the weight of the vinyl chloride resin.

2. An insulated conductor intended for use at 90° C. and having improved insulation resistance in wet locations at 60° C. which comprises (1) a copper core and (2) insulation for the latter comprising (a) a solid polyvinyl chloride resin and (b) a plasticizer for the polyvinyl chloride composed of pentaerythritol dibutyrate dicaprylate having a per cent hydroxyl within the range of about 0.1 to 0.5 per cent, said plasticizer comprising, by weight, from 30 to 70 per cent of the weight of the polyvinyl chloride resin.

3. An insulated conductor intended for use at 90° C. and having improved insulation resistance in wet locations at 60° C. comprising (1) a copper conducting core and (2) insulation for the copper core comprising, by weight, (a) 100 parts polyvinyl chloride, (b) from 30 to 70 parts of a plasticizer for the polyvinyl chloride comprising pentaerythritol dibutyrate dicaprylate having a per cent hydroxyl within the range of about 0.1 to 0.5 per cent, (c) from 5 to 15 parts of a stabilizer for the polyvinyl chloride and (d) up to 25 parts of a filler.

References Cited in the file of this patent

UNITED STATES PATENTS

| Number | Name | Date |
|---|---|---|
| 2,381,247 | Barth et al. | Aug. 7, 1945 |
| 2,502,370 | Craver | Mar. 28, 1950 |
| 2,579,219 | Valk | Dec. 18, 1951 |
| 2,617,779 | Griffith et al. | Nov. 11, 1952 |